UNITED STATES PATENT OFFICE.

ALBERT BUSCH, OF BRUNSWICK, AND RICHARD LAUCH, OF BERLIN, GERMANY, ASSIGNORS TO THE FIRM OF JOHANN A. WÜLFING, OF BERLIN, GERMANY.

MANUFACTURE OF CALCIUM ACETYL SALICYLATE.

1,225,407.   Specification of Letters Patent.   Patented May 8, 1917.

No Drawing.   Application filed June 9, 1915. Serial No. 33,064.

*To all whom it may concern:*

Be it known that we, Dr. ALBERT BUSCH, a subject of the Duke of Brunswick, residing at Brunswick, in the Dukedom of Brunswick, Germany, and Dr. RICHARD LAUCH, a subject of the King of Prussia, residing at Berlin, Germany, have invented new and useful Improvements in the Manufacture of Calcium Acetyl Salicylate, of which the following is a specification.

The known processes of manufacturing calcium acetyl-salicylate consist firstly in treating acetyl-salicylic acid with calcium hydroxid or calcium carbonate in presence of large proportions of certain solvents, such as alcohols or acetone, or of water, filtering the solution and crystallizing the calcium salt of acetyl-salicylic acid from it, or precipitating the salt from the solution by ether or, when water was used, by methyl alcohol; or secondly in causing calcium-alcoholate or calcium salts of certain organic acids to act upon a solution of acetyl-salicylic acid in alcohol; or thirdly in combining the alkali salts of acetyl-salicylic acid in alcoholic solution with the calcium salts of acids, whose alkali salts are soluble in alcohol.

All these processes are based on the supposition, that the calcium acetyl-salicylate could not otherwise be obtained than by having either the acetyl-salicylic acid, or its calcium salt, or both temporarily dissolved in an organic solvent, or in water.

Now, a new process has been discovered by which it is possible to obtain a good yield of the calcium acetyl-salicylate without having to use those large quantities of liquids which were indispensable with processes hitherto known. The utility of the present invention resides in the fact that thereby it is now feasible to obtain an increased yield, in fact, an almost theoretical yield, of calcium acetyl-salicylate by means of comparatively small quantities of organic solvents.

It was found that for the purpose of forming the calcium salt from acetyl-salicylic acid and calcium hydroxid, it is not at all necessary to completely dissolve the acetyl-salicylic acid or its calcium salt, or both, to obtain a calcium-acetyl-salicylate that clearly dissolves in water, but that it is possible by intimately mixing acetyl-salicylic acid with an equivalent proportion of calcium hydroxid in a dry state and moistening the mixture with small proportions of certain organic solvents, such as, alcohols, ketones, or esters of the aliphatic series, to complete the reaction, provided that after moistening the mixture with the organic solvent, the action is allowed sufficient time.

The use of calcium carbonate is precluded for the purpose of the present process owing to its action being too slow and indolent. However, in some cases pure calcium oxid may be used instead of calcium hydroxid. As organic liquids the technically obtainable alcohols, ketones, and esters of the aliphatic series can be used; technical methylethylketone, ethyl alcohol, and acetic ether have been found especially suitable for the purpose. If the product of reaction obtained by moistening an intimate mixture of equivalent proportions of acetyl-salicylic acid and calcium hydroxid, with ethyl alcohol, or methylethylketone, or acetic ether, is dried after the removal of the solvent, a salt results which clearly dissolves in water with a slight acid reaction. The removal of the solvent may be accomplished by any of the methods well known to those skilled in the art to which this invention appertains; so, for instance, the solvent may be removed by the application of pressure and subsequent evaporation at a low temperature and, preferably, *in vacuo*. The salt thus produced may without further purification be used for therapeutical purposes since the small excess of acetyl-salicylic acid, which is a therapeutic itself can in no sense cause any detrimental action. However, if it is desired to reduce this product to a neutrally reacting salt it may be washed or extracted with a small proportion of ether for the removal of the acid ingredient. After the treatment with ether the resulting product is a white powder that is soluble in water to neutral solution and consists of calcium acetyl-salicylate.

*Example 1.*

18.05 parts by weight of acetyl-salicylic acid finely ground and sifted, and 3.7 parts by weight of finely ground and sifted calcium hydroxid are well and intimately mixed in a dry state and moistened with approximately 20 parts by weight of strong ethyl alcohol. The mixture is well kneaded till a sample clearly dissolves in water. When this point is reached the product of reaction is freed of the alcohol, and is then dried and ground. Ferric chlorid produces in an aqueous solution of this powder a flesh colored precipitate.

*Example 2.*

18.05 parts by weight of acetyl-salicylic acid, finely ground and sifted, and 3.7 parts by weight of finely ground and sifted calcium hydroxid are intimately mixed in a dry state, thereafter moistened with approximately 19 parts by weight of acetylethyl ester (acetic ether) and kneaded till a sample completely and clearly dissolves in water. At this point the product of reaction is freed of the acetic ether, then dried, ground, and finely sifted. Ferric chlorid produces in a solution of the thus obtained calcium acetyl salicylate a flesh colored precipitate.

*Example 3.*

18.05 parts by weight of acetyl-salicylic acid, finely ground and sifted, and 3.7 parts by weight of pure and finely ground calcium hydroxid are intimately mixed in a dry state and moistened with approximately 20 parts by weight of technical methyl-ethyl-ketone. The mixture is subjected to a kneading action till a sample clearly dissolves in water. At reaching this point the product of reaction is freed of the methyl-ethyl-ketone, then ground and washed, or extracted, with ether. The object of washing or extracting the product of reaction with ether has nothing to do with the reaction itself, but is to remove the attached acid ingredients; the product resulting from this treatment is a calcium acetyl-salicylate that is soluble in water to a neutral solution. After the removal of the ether the thus formed calcium acetyl-salicylate is dried, ground, and finely sifted. The absence of salicylic acid can readily be proved by the reaction ferric chlorid produces.

While in the claims hereto appended we have specified the ketones of the aliphatic series as an appropriate solvent for the purpose of our invention, it must be understood that the alcohols and esters of the aliphatic series are to be considered equivalents to the aforesaid ketones.

What we claim is:—

1. The improved manufacture of calcium acetyl-salicylate, consisting in mixing equivalent proportions of acetyl-salicylic acid and calcium hydroxid in a dry state, and moistening the mixture with a ketone of the aliphatic series.

2. The improved manufacture of calcium acetyl-salicylate, consisting in mixing equivalent proportions of acetyl-salicylic acid and calcium hydroxid in a dry state, and moistening the mixture with a ketone of the aliphatic series to a moist paste.

3. The improved manufacture of calcium acetyl-salicylate, consisting in mixing equivalent proportions of acetyl-salicylic acid and calcium hydroxid in a dry state, and moistening the mixture with a ketone of the aliphatic series to a moist paste and subjecting the paste thus obtained to a kneading action.

4. The improved manufacture of calcium acetyl-salicylate, consisting in mixing as intimately as possible equivalent proportions of acetyl-salicylic acid and calcium hydroxid in a dry state, moistening the mixture with a ketone of the aliphatic series to a moist paste, and kneading the mass till the product of reaction is clearly soluble in water.

5. The improved manufacture of calcium acetyl-salicylate, consisting in mixing equivalent proportions of acetyl-salicylic acid and calcium hydroxid in a dry state, moistening the mixture with a ketone of the aliphatic series, subjecting the moistened mixture to a kneading action, and removing the solvent.

6. The improved manufacture of calcium acetyl-salicylate, consisting in mixing equivalent proportions of acetyl-salicylic acid and calcium hydroxid in a dry state, moistening the mixture with a ketone of the aliphatic series to a moist paste, subjecting the paste thus obtained to a kneading action, and removing the solvent.

7. The improved manufacture of calcium acetyl-salicylate, consisting in mixing as intimately as possible equivalent proportions of acetyl-salicylic acid and calcium hydroxid in a dry state, moistening the mixture with a ketone of the aliphatic series to a moist paste, kneading the paste till the product of reaction is clearly soluble in water, and removing the solvent.

8. The improved manufacture of calcium acetyl-salicylate, consisting in mixing equivalent proportions of acetyl-salicylic acid and calcium hydroxid in a dry state, moistening the mixture with a ketone of the aliphatic series to a moist paste, subjecting the paste thus obtained to a kneading action, removing the solvent, drying and disintegrating the resulting product, and subjecting the same to a treatment with ether.

9. The improved manufacture of calcium acetyl-salicylate, consisting in mixing as intimately as possible equivalent proportions of acetyl-salicylic acid and calcium hydroxid in a dry state, moistening the mixture with a ketone of the aliphatic series to a moist paste, kneading the paste till the product of reaction is clearly soluble in water, removing the solvent, drying and disintegrating the resulting product, and subjecting the same to a treatment with ether.

10. The improved manufacture of calcium acetyl-salicylate, consisting in mixing equivalent proportions of acetyl-salicylic acid and calcium hydroxid in a dry state, moistening the mixture with a ketone of the aliphatic series to a moist paste, subjecting the paste, thus obtained, to a kneading action, removing the solvent, drying and disintegrating the resulting product, and subjecting the same to a treatment with ether till the salt dissolves in water to a neutral solution.

11. The improved manufacture of calcium acetyl-salicylate, consisting in mixing as intimately as possible equivalent proportions of acetyl-salicylic acid and calcium hydroxid in a dry state, moistening the mixture with a ketone of the aliphatic series to a moist paste, kneading the paste till the product of reaction is clearly soluble in water, removing the solvent, drying and disintegrating the resulting product, and subjecting the same to a treatment with ether till the salt dissolves in water to a neutral solution.

Dr. ALBERT BUSCH.
Dr. RICHARD LAUCH.